(12) United States Patent
Kumar et al.

(10) Patent No.: US 10,442,270 B2
(45) Date of Patent: Oct. 15, 2019

(54) SYSTEM AND METHOD FOR CLEARING A CLOGGED HVAC DRAIN TUBE

(71) Applicant: Ford Global Technologies, LLC, Dearborn, MI (US)

(72) Inventors: Mukesh Kumar, Canton, MI (US); Robert Steven Sawyer, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 15/601,194

(22) Filed: May 22, 2017

(65) Prior Publication Data

US 2018/0334011 A1    Nov. 22, 2018

(51) Int. Cl.
*B60H 1/00* (2006.01)
*B60H 1/32* (2006.01)

(52) U.S. Cl.
CPC ..... *B60H 1/00585* (2013.01); *B60H 1/00564* (2013.01); *B60H 1/00864* (2013.01); *B60H 1/3233* (2013.01); *Y10T 137/0419* (2015.04); *Y10T 137/4245* (2015.04)

(58) Field of Classification Search
CPC ............ B60H 1/00585; B60H 1/00564; Y10T 137/0402; Y10T 137/0419; Y10T 137/4245
See application file for complete search history.

(56) References Cited

U.S. PATENT DOCUMENTS

| | | | |
|---|---|---|---|
| 5,983,659 A | 11/1999 | Lemaitre et al. | |
| 5,983,919 A * | 11/1999 | Ottinger et al. | F16T 1/20 137/195 |
| 6,584,795 B1 | 7/2003 | Bruss | |
| 7,857,004 B2 | 12/2010 | Pearson | |
| 2014/0130888 A1* | 5/2014 | Kaiser et al. | B08B 9/032 137/15.01 |
| 2015/0101358 A1* | 4/2015 | Kaiser et al. | B08B 9/032 62/157 |

* cited by examiner

*Primary Examiner* — Kevin L Lee
(74) *Attorney, Agent, or Firm* — Vichit Chea; Brooks Kushman, P.C.

(57) ABSTRACT

A vehicle system is provided. The vehicle system may include a tube configured to provide an outlet for condensate collected within a plenum that connects a cabin duct to a ventilation manifold arrangement. The vehicle system may also include a clearing duct that bypasses the plenum and connects the tube and arrangement, and a controller configured to block passageways between the plenum and cabin duct, and to activate a blower of the arrangement to build pressure within the plenum and clearing duct to clear the tube.

20 Claims, 2 Drawing Sheets

SYSTEM AND METHOD FOR CLEARING A CLOGGED HVAC DRAIN TUBE

TECHNICAL FIELD

This disclosure relates to heating, ventilation, air conditioning, and circulation (HVAC) systems for automotive vehicles and methods of operating the same.

BACKGROUND

Most vehicles are equipped with a cabin HVAC unit designed to transfer heat from the refrigerant and heated coolant into air, and to blow the air into the vehicle cabin. The HVAC unit may contain a heater core, an evaporator core, a plenum, and a plenum blower, among other components. The plenum may include various deflection doors and ducts that divert air to various vents disposed within the vehicle cabin. As doors within the plenum swing open or adjust, the air flowing through the plenum is distributed from one vent system to another. As the heated air travels through the heater and evaporator cores, water vapor in the air surrounding the cores may condense and collect in the bottom of the plenum. The plenum may include a drain tube used to drain the condensed liquid. At times, the drain tube may become clogged and rendered unable to drain the condensed liquid from the plenum.

SUMMARY

According to one embodiment of this disclosure, a method for clearing a tube configured to provide an outlet for condensate collected within a plenum within a vehicle, is provided. The method be accomplished by a controller and may include blocking passageways between the plenum and a cabin duct, activating a blower of a ventilation arrangement to build pressure within the plenum and a clearing duct that bypasses the plenum and connects the tube and arrangement, to clear the plenum drain tube connected to the plenum.

The method may be initiated in response to a predetermined number of engine starts.

The blocking may include closing a defroster door disposed between the plenum and the cabin duct.

The method may also include, before the activating, opening a fresh air circulation door connected to the ventilation manifold arrangement to draw air that is external to the vehicle to the plenum and the clearing duct.

The method may also include, after the activating, closing the fresh air circulation door to block a passageway between the ventilation manifold arrangement and the air inlet duct to build pressure within the clearing duct and plenum.

The method may also include closing a mode door disposed between the plenum and the cabin duct to block air from escaping the plenum to build pressure within the plenum.

The method may also include closing a clearing duct door disposed within the clearing duct to block air from passing through the clearing duct and the tube after the clearing step.

According to one embodiment of this disclosure, a vehicle HVAC apparatus is provided. The apparatus may include a tube, a clearing duct and a blower. The tube may be configured to provide an outlet for condensate collected within a plenum that connects a cabin duct to a ventilation manifold arrangement. The clearing duct may bypass the plenum and connect the tube and arrangement. The blower of the arrangement may be configured to build pressure within the plenum and clearing duct to clear the tube.

The apparatus may include a defroster door. The defroster door may be connected between the plenum and the cabin duct. The defroster door may be operable from an open position to a closed position to facilitate an accumulation of pressure within the plenum and clearing duct to clear the tube.

The apparatus may include a mode door. The mode door may be connected between the plenum and the cabin duct. The mode door may be operable from an open position to a closed position. When the mode door is closed, it may facilitate an accumulation of pressure within the plenum and clearing duct to clear the tube.

The apparatus may include a fresh air door that may be connected to the ventilation manifold arrangement. The fresh air duct may be opened to facilitate a flow of air from the ventilation manifold arrangement to the plenum and the clearing duct.

The apparatus may include a fresh air circulation door. The fresh air circulation door may be closed to block a passageway between the ventilation manifold arrangement and the air inlet duct to build pressure within the clearing duct and plenum after activating the blower.

According to yet another embodiment of this disclosure, a vehicle system is provided. The vehicle system may include a tube configured to provide an outlet for condensate collected within a plenum that connects a cabin duct to a ventilation manifold arrangement. The vehicle system may also include a clearing duct that bypasses the plenum and connects the tube and arrangement and a controller that may be configured to block passageways between the plenum and cabin duct, and activate a blower of the arrangement to build pressure within the plenum and clearing duct to clear the tube.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
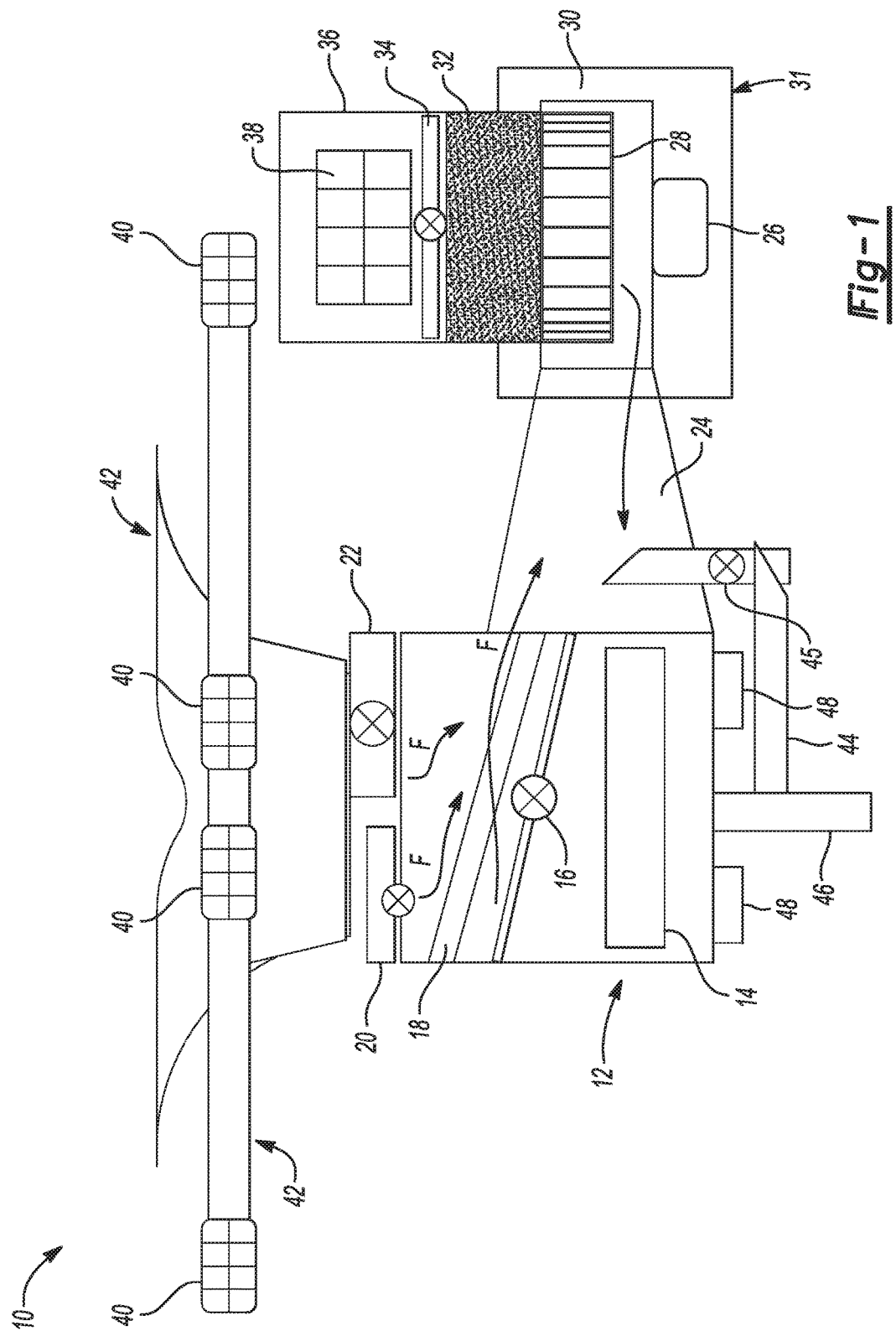
FIG. 1 is a schematic illustration of a motor vehicle HVAC system according to at least one embodiment of this disclosure.

Referring to FIG. 1, a schematic of a vehicle HVAC system is illustrated. The HVAC system 10 may include a plenum 12 that may include or house a heater core, or air conditioner evaporator core 14, or both that may receive heated coolant from an engine or an auxiliary heat source, including but not limited to refrigerant, electricity, etc. An air blend door 16 may be disposed between the evaporator core 18 and may be operable to alter the position of one or more vents to control the amount of hot air and cold air within the plenum to achieve a desired temperature within the vehicle cabin. A defroster or demist door 20 and mode door 22 are operatively connected to the plenum. The defroster or demist door 20 is disposed between the plenum 12 and a defrost nozzle 42. The panel mode door 22 is disposed between the plenum 12 and a number of outlet vents 40. More specifically, the defroster or demist door is operatively connected between the plenum and the vents 40 disposed within a vehicle dashboard near the vehicle windshield. When open, the defroster or demist door 20 permits a flow of heated or cooled air from the plenum to the vents 40. The mode door 22 is operable to open or close a pathway for various heating or cooling settings. For example, when an occupant wishes to defrost the windshield, the defroster setting may be chosen, and the defrost or demist door 20 may be actuated to permit a flow of heated air from the plenum 12 through the defroster or demist door 20 to the vents 40.

As the heated air travels through the heater and air conditioning cores 14, the water vapor in the air surrounding the cores may condense and collect in the bottom of the plenum 12. The collected fluid may sway and slosh within the plenum 12 as the vehicle is moving. The movement of the fluid may cause an unpleasant or annoying noise to the occupants of the cabin. Additionally, if the fluid remains within the plenum 12 for an extended period of time, it may cause a musty, stale, or damp smell within the vehicle cabin, causing another customer annoyance. The plenum 12 may include a drain tube 46 used to drain the condensed liquid and prevent the noise and smell associated with the collected water within the plenum 12. At times debris, including but not limited to leaves, cobwebs, screws or other components within HVAC unit 10 may accumulate within the drain tube 46 causing a clog or blockage.

A ventilation manifold 24 connects the plenum 12 to a ventilation arrangement or blower assembly 31 consisting of a blower scroll 30, fan 28, and fan motor 26. The fan 28 may be powered by a fan motor 26. The fan motor 26 may receive an electrical signal from a controller 50 (FIG. 2) to turn on and off. Moreover, the speed of the fan 28 may be set at various rates between minimum and a maximum setting. The fan 28 may be operatively connected to an air inlet duct 36. A blower scroll 30 and filter 32 may be disposed between the air inlet duct 36 and the fan 28. However, the filter may be disposed within the ventilation arrangement or blower assembly in a location other than the position described. The blower scroll may increase the energy in the air within the HVAC unit. A fresh air inlet door 34 may be disposed within the air inlet duct 36. The fresh air inlet door 34 may be positioned from an opened to a closed position and any adjustable position therebetween. When open, the fresh air inlet door 34 permits air flow from the fresh air opening 38 through the air inlet duct 36 by the fan 28.

A clog-clearing duct or clearing duct 44 may be disposed between the ventilation manifold 24 and the drain tube 46. In the instance of a clogged or blocked drain tube 46, the clearing duct 44 may allow a flow of air generated by the fan from the air inlet duct to the drain tube 46 to clear the clog. A clearing duct door 45 may be disposed within the clearing duct 44. The door 45 may be kept closed to prevent air from escaping through the duct 44 as it travels from the air inlet duct 36 to the plenum 12. In case of a clogged drain tube 46 or at a certain time interval the door 45 may be opened to clear the clogged or blocked drain tube 46. The clearing duct door 45 may be opened once a clog is detected or at a predetermined interval.

The ventilation manifold 24, vents 40, ducts and defrost nozzles 42, clog-clearing duct or clearing duct 44, drain tube 46 and air inlet duct 36 may be made of various materials, including but not limited to ABS resins, polypropylene, and SMA resins. The components may be manufactured by various processes such as blow-molding or injection molding to produce the complex shape and design of the components. The components may also be produced by other rapid production processes, such as three-dimensional printing or other additive manufacturing techniques.

Figure 2:
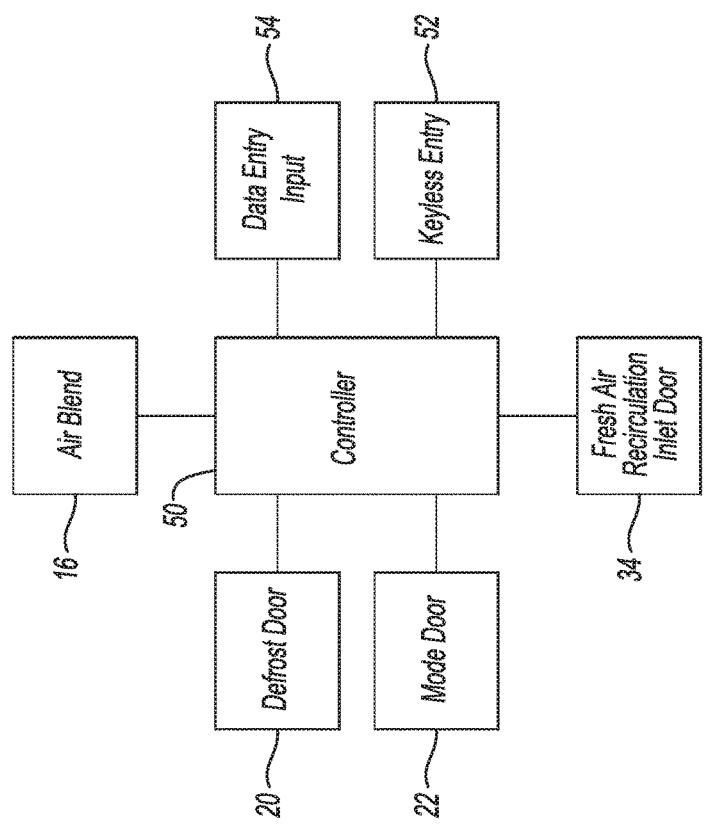
FIG. 2 is a schematic illustration of a control system for a motor vehicle HVAC system.

Referring to FIG. 2, a vehicle HVAC control system is illustrated. The control system may include a controller 50 that is electrically connected to various components of the HVAC system. The controller 50 may be a plurality of controllers that communicate via a serial bus (e.g., Controller Area Network (CAN), FlexRay, Ethernet, etc.) or via dedicated electrical conduits. The controller generally includes any number of microprocessors, microcontrollers, ASICs, ICs, volatile (e.g., RAM, DRAM, SRAM, etc.) and non-volatile memory (e.g., FLASH, ROM, EPROM, EEPROM, MRAM, etc.) and software code to co-act with one another to perform a series of operations. The controller may also include predetermined data, or "look up tables" that are based on calculations and test data, and are stored within the memory. The controller may communicate with other vehicle systems and controllers over one or more wired or wireless vehicle connections using common bus protocols (e.g., CAN, LIN, Ethernet, etc.). Used herein, a reference to "a controller" refers to one or more controllers.

The controller 50 includes a data input 54 for receiving data respecting the status of the ignition system of the motor vehicle. The data input 54 may receive data indicative of the speed of the engine, measured in revolutions per minute, that powers the vehicle. Occupancy status, including but not limited to, the status of the vehicle door locks, seatbelt sensors, seat occupancy sensors, and other suitable sensors capable of monitoring the presence of motor vehicle occupants may be received by the data input 54. In addition to the vehicle occupancy status, the vehicle occupant may choose a certain heating or cooling setting, including but not limited to, defrost, demist, air conditioning, and heating. The dashboard vents 40, floor outlet vents 46, and rear outlets 48 (FIG. 1) may be opened to provide air to the cabin for the various heating and cooling settings. The heating or cooling settings may be received by the data input sensor 54 as well. The number key-on or key-off events may also be received by the controller 50 from the keyless entry device 52. The controller may compute or determine the number of key-on or key-off events executed and compare that number with a predetermined value indicative of a clogged drain tube. Moreover, the number of engine starts and stops may be compared to a predetermined value that is indicative of a blocked drain. Finally, the data input 54 may receive data from an automotive technician to unblock or clear the clogged drain tube 46.

As further illustrated in FIG. 2, the controller 50 is operatively connected to the air blend door 16, the defroster door 20, mode door 22 and fresh air inlet door 34 and their associated actuators (not shown). The actuators may include a small motor and one or more gear sets operably connected to each of the doors mentioned above. The controller 50 is configured to displace the air blend door 16, the defroster door 20, mode door 22 and fresh air inlet door 34 between open and closed positions.

Figure 3:
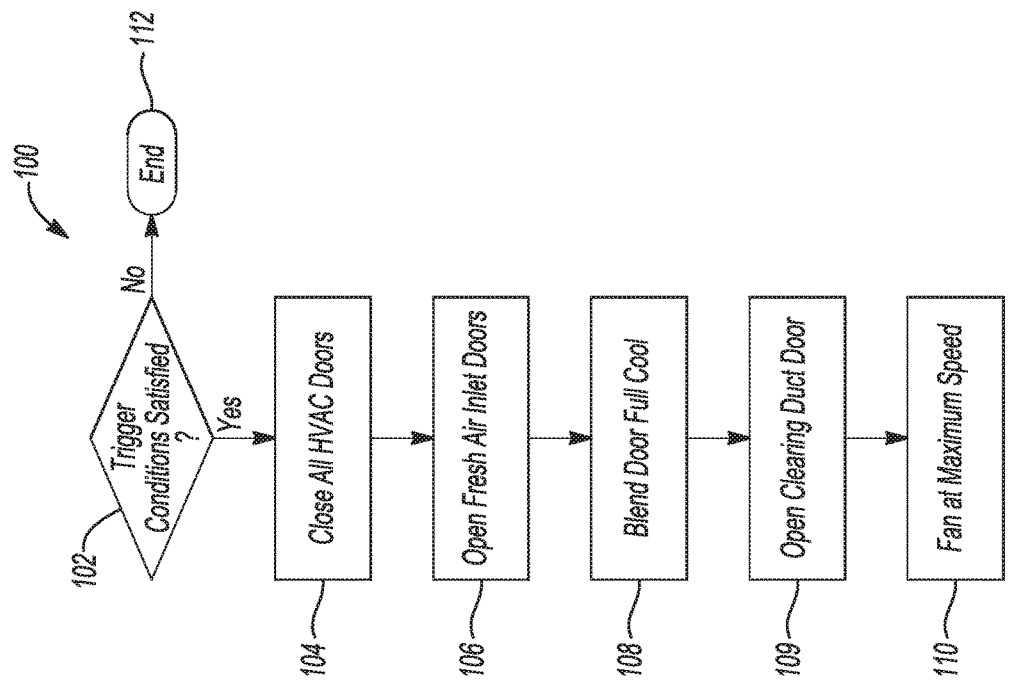
FIG. 3 is a flowchart for the apparatus illustrating a method of operating the motor vehicle HVAC system.

Referring to FIG. 3, a flowchart 100 for a method of operating the vehicle HVAC system 10 is illustrated. In operation 102, the controller branches on determining whether a trigger condition to clear the clogged drain tube exists. If yes, the controller branches to operation 104. In operation 104, the air blend door 16, the defroster door 20, mode door 22 and fresh air inlet door 34 may be closed after receiving a signal from the controller 50. After operation 104, the air inlet door 34 is opened. When the air inlet door 34 is opened, fresh air may be pulled in from the fan 28 once powered. In operation 108, the air blend door 16 is set to full cool mode. In full cool mode, the fresh air inlet door 34 is closed. Closing the fresh air inlet door 34 may increase the pressure within the plenum 12. In operation 109, the clearing duct door 45 may be opened to facilitate a flow of air through the clearing duct 44. In operation 110, the fan motor 26 and fan 28 may be set to a maximum speed. When at maximum speed, the fan 28 forces air through from the air inlet duct 36 through the clearing duct 44 and through the drain tube 46 to clear any blockage within the drain tube 46.

It should be understood that the flowchart in FIG. 3 is for illustrative purposes only and that the method 100 should not be construed as limited to the flowchart in FIG. 3. Some of the steps of the method 100 may be rearranged while others may be omitted entirely.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for clearing a tube configured to provide an outlet for condensate collected within a plenum of a vehicle, comprising:
   by a controller,
      blocking passageways between the plenum and a cabin duct; and
      activating a blower of a ventilation arrangement to build pressure within the plenum, and a clearing duct that bypasses the plenum and connects the tube and arrangement, to clear the tube connected to the plenum.

2. The method of claim 1, wherein the blocking is initiated in response to a predetermined number of engine starts.

3. The method of claim 1, wherein the blocking includes closing a defroster door disposed between the plenum and the cabin duct.

4. The method of claim 1 further comprising, before the activating, opening a fresh air circulation door connected to the ventilation arrangement to draw air that is external to the vehicle to the plenum and the clearing duct.

5. The method of claim 1 further comprising, after the activating, closing the fresh air circulation door to block a passageway between the ventilation arrangement and an air inlet duct to further build pressure within the clearing duct and plenum.

6. The method of claim 1 further comprising closing a mode door disposed between the plenum and the cabin duct to block air from escaping the plenum to further build pressure within the plenum.

7. The method of claim 1 further comprising, after the activating, closing a clearing duct door disposed within the clearing duct to block air from passing through the clearing duct and the tube.

8. A vehicle HVAC apparatus, comprising:
   a tube configured to provide an outlet for condensate collected within a plenum that connects a cabin duct to a ventilation manifold arrangement;
   a clearing duct that bypasses the plenum and connects the tube and arrangement; and
   a blower of the arrangement configured to build pressure within the plenum and clearing duct to clear the tube.

9. The apparatus of claim 8 further comprising a defroster door connected between the plenum and the cabin duct, and moveable between an open position and a closed position to facilitate an accumulation of pressure within the plenum and clearing duct to clear the tube.

10. The apparatus of claim 8 further comprising a mode door connected between the plenum and the cabin duct, and moveable between an open position and a closed position to facilitate an accumulation of pressure within the plenum and clearing duct to clear the tube.

11. The apparatus of claim 8 further comprising a fresh air door connected to the ventilation manifold arrangement configured to, when open, facilitate a flow of air from the ventilation manifold arrangement to the plenum and the clearing duct.

12. The apparatus of claim 11, wherein the fresh air door is further configured to, when closed, block a passageway between the ventilation manifold arrangement and an air inlet duct to further build pressure within the clearing duct and plenum.

13. The apparatus of claim 8, further comprising a clearing duct door disposed within the clearing duct to block air from passing through the clearing duct and the tube.

14. A vehicle system comprising:
   a tube configured to provide an outlet for condensate collected within a plenum that connects a cabin duct to a ventilation manifold arrangement;
   a clearing duct that bypasses the plenum and connects the tube and arrangement; and
   a controller configured to block passageways between the plenum and cabin duct, and activate a blower of the arrangement to build pressure within the plenum and clearing duct to clear the tube.

15. The vehicle of claim 14, wherein the controller is further configured to perform the blocking and activating responsive to occurrence of a number of key-on events.

16. The vehicle of claim 14, wherein the controller is further configured to close a defroster door disposed between the plenum and the cabin duct to block air from escaping the plenum to further build pressure within the plenum.

17. The vehicle of claim 14, wherein the controller is further configured to open a fresh air circulation door connected to the ventilation manifold arrangement, wherein the open fresh air circulation door is configured to facilitate a drawing of air external to the vehicle to the plenum and clearing duct.

18. The vehicle of claim 14, wherein the controller is further configured to, after activating the blower, close the fresh air circulation door to block a passageway between the ventilation manifold arrangement and the air inlet duct to further build pressure within the clearing duct and plenum.

19. The vehicle of claim 14, wherein the controller is further configured to close a mode door disposed between the plenum and the cabin duct to block air from escaping the plenum to further build pressure within the plenum.

20. The vehicle of claim 14, wherein the blocking and activating is responsive to a number of engine start events.

* * * * *